United States Patent
Lemke et al.

(10) Patent No.: US 11,021,352 B2
(45) Date of Patent: Jun. 1, 2021

(54) DRIVER CAB FOR AN INDUSTRIAL TRUCK

(71) Applicant: Jungheinrich Aktiengesellschaft, Hamburg (DE)

(72) Inventors: Frank Lemke, Kaltenkirchen (DE); Michael Niebuhr, Bargteheide (DE); Klaus-Peter Ribbentrop, Henstedt-Ulzburg (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 197 days.

(21) Appl. No.: 16/255,959

(22) Filed: Jan. 24, 2019

(65) Prior Publication Data

US 2019/0225468 A1 Jul. 25, 2019

(30) Foreign Application Priority Data

Jan. 24, 2018 (DE) ...................... 10 2018 101 531.3

(51) Int. Cl.
*B66F 9/075* (2006.01)
*B62D 33/06* (2006.01)

(52) U.S. Cl.
CPC .......... *B66F 9/07545* (2013.01); *B62D 33/06* (2013.01); *B66F 9/07504* (2013.01); *B66F 9/07513* (2013.01)

(58) Field of Classification Search
CPC .............. B66F 9/07545; B66F 9/07513; B66F 9/07504; B66F 9/0759; B62D 33/06
USPC ........................................................ 296/102
See application file for complete search history.

(56) References Cited

U.S. PATENT DOCUMENTS

| | | | | |
|---|---|---|---|---|
| 4,770,263 | A * | 9/1988 | Yoshioka | B60N 2/38 180/69.24 |
| 5,190,435 | A * | 3/1993 | Epstein | B66F 9/07545 187/222 |
| 6,182,797 | B1 * | 2/2001 | Tebbe | B66F 9/07531 187/222 |
| 6,206,457 | B1 * | 3/2001 | Sakyo | B62D 21/09 296/190.08 |
| 7,306,280 | B1 * | 12/2007 | Kraimer | B66F 9/07504 280/756 |
| 7,913,792 | B2 * | 3/2011 | Bruno | B66F 9/07572 180/209 |
| 9,663,920 | B2 * | 5/2017 | Wada | E02F 9/163 |
| 9,841,555 | B2 * | 12/2017 | Downie | G02B 6/02019 |

(Continued)

FOREIGN PATENT DOCUMENTS

DE 10312432 A1 4/2003

OTHER PUBLICATIONS

DE 102018101531.3 filed Jan. 24, 2018, German Search Report dated Jan. 7, 2019, 10 pages.

*Primary Examiner* — Pinel E Romain
(74) *Attorney, Agent, or Firm* — Barclay Damon LLP

(57) ABSTRACT

A driver cab for an industrial truck comprises a driver canopy supported by four pillars, wherein two of the four pillars are configured as entry way pillars and two of the four pillars are configured as end wall pillars. A side wall extends between each of the entry way pillars and the end wall pillars, an end wall extends between the end wall pillars, and a boarding area extends between the entry way pillars. Each of the end wall pillars comprises a tubular profile and at least one of the entry way pillars comprises a corner profile which comprises two limbs arranged at an angle with respect to one another.

15 Claims, 4 Drawing Sheets

(56) References Cited

U.S. PATENT DOCUMENTS

| | | | |
|---|---|---|---|
| 2005/0177987 A1* | 8/2005 | McKnight | B62D 27/065 29/252 |
| 2007/0017728 A1* | 1/2007 | Sano | B60N 2/773 180/334 |
| 2007/0024088 A1* | 2/2007 | Mori | B62D 33/0617 296/190.08 |
| 2008/0001435 A1 | 1/2008 | Kraimer | |
| 2018/0112372 A1* | 4/2018 | Kato | E02F 3/3668 |

* cited by examiner

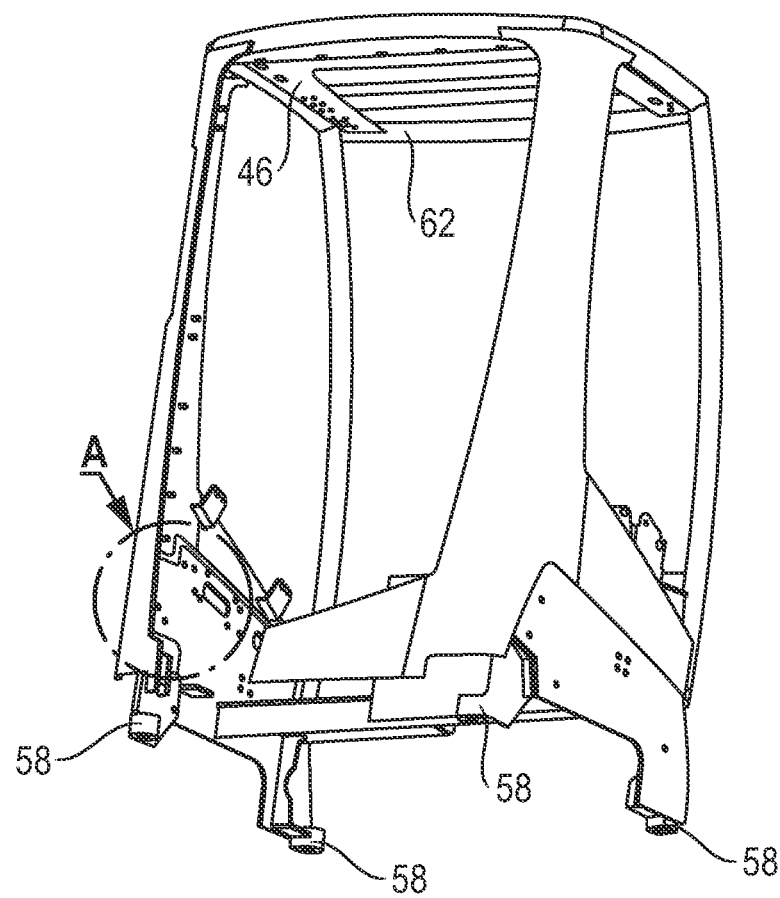
Fig. 3
Detail B
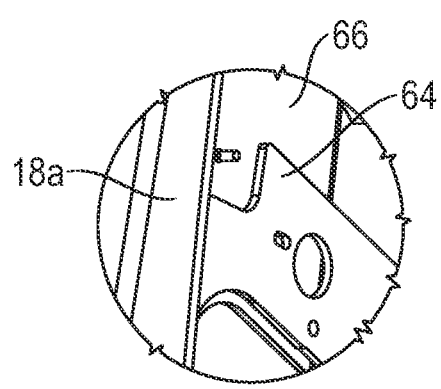
Detail A
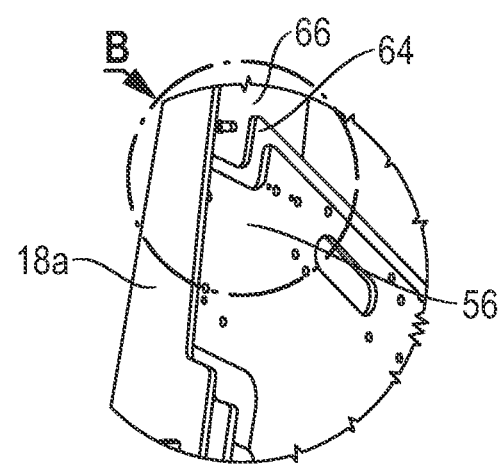

DRIVER CAB FOR AN INDUSTRIAL TRUCK

CROSS REFERENCE TO RELATED INVENTION

This application is based upon and claims priority to, under relevant sections of 35 U.S.C. § 119, German Patent Application No. 10 2018 101 531.3, filed Jan. 24, 2018, the entire contents of which are hereby incorporated by reference.

BACKGROUND

The present invention relates to a driver cab for an industrial truck. A driver or driver's cab having a space for the vehicle operator can be provided in industrial trucks having different constructions and types of use. The space in a driver's cab can be configured, for example, as a seat or as a driver's standing position. The process of equipping a corresponding driver's cab with a driver's canopy is known. The driver's canopy must, on the one hand, fulfil the object of providing as good a view as possible of the raised load and, on the other hand, protect the driver from falling objects. The driver's cab having the driver's canopy must therefore be configured in a sufficiently stable manner.

The concept of providing two pillars on the vehicle sides of the drive portion is known from the prior art. These pillars can, for example, be tilted slightly forwards, wherein the driver's canopy is then configured as a crown having corresponding strutting.

BRIEF SUMMARY OF THE INVENTION

The object of the present invention is to provide a driver's cab, which combines good visibility outwardly into the working environment with the greatest possible stability, for an industrial truck.

In an embodiment, a driver cab comprises a driver canopy supported by four pillars, wherein two of the pillars are configured as A-pillars (or entry way pillars) and two of the pillars are configured as B-pillars (or end wall pillars). Since front and back and, therefore, the role of the A-pillar and the B-pillar are not immediately fixed in the case of an industrial truck, it is specified in the case of the driver's cab according to the invention that the B-pillars point towards a load portion of the industrial truck and an end wall is arranged between these, and that a boarding area is provided between the A-pillars.

In an embodiment, the B-pillars are configured as a tubular profile, for example as a tubular profile which is round or oval in cross-section or as a round double profile having a waist-like constriction. At least one, preferably both A-pillars are formed from a corner profile which comprises two limbs arranged at an angle to one another. The corner profile is configured as an open profile which comprises two limbs arranged at an angle to one another and which are each flat. The advantage of the driver's cab according to the invention is that, in using the corner profile, a profile is deployed, which only restricts a view from the driver's cab of the working area and the surroundings of the industrial truck to a small extent. Unlike, for example, driver's cabs equipped with two wide struts, a corner profile having limbs arranged angularly to one another produces a significantly smaller restriction of the field of view. The result of using four pillars is also that the field of view, which is needed by the driver to have an overall view of the surroundings, remains clear. The stiffness of the corner profile also allows a small amount of material to be used, which likewise results in a clear field of view. In addition, the corner profile takes up less space, as a result of which good use can be made of the interior of the driver's cab. The corner profile is preferably positioned adjacent to a driver's seat or a driver's stand.

In an embodiment, the limbs of the corner profile are configured as flat limbs which are connected to one another by means of a rounded transition area. The transition area forms an outer edge of the driver's cab. The corner profile for the driver's cab according to the invention substantially consists of a flat material which has a rounded transition area approximately centrally, wherein the limbs protruding therefrom extend away in a flat manner and preferably enclose a constant angle to one another in the longitudinal direction of the profile. Both A-pillars are preferably configured as a corner profile, the A-pillars do not have to be configured in an identical manner in this case.

In an embodiment, fastening means for fastening the driver's cab to a vehicle frame are provided. The driver's cab is intrinsically, as a whole, a finished welded part which is fastened, as a whole, as a pre-assembled unit to the vehicle frame of the industrial truck. Fastening means such as, for example, eyelets, rings, openings or the like can preferably be provided on at least one of the pairs of pillars for said fastening to the end opposite the driver's canopy, by means of which fastening means the driver's cab is assembled and fastened to the vehicle frame.

In an embodiment, the driver's canopy is configured with a U-shaped flat profile. An upright holding profile is arranged in each case on the limbs of the U-shaped flat profile, on each of which the ends are held by one or more transverse profiles running between the limbs. The holding profiles can be formed by chamfered edges of the flat profile. As is known in the case of driver's canopies, the transverse profiles are fastened to the standing holding profiles obliquely with respect to the vertical, so that a view directed obliquely upwards does not fall on the wide side of the transverse struts, but these only partially block the view upwards, or preferably only do so at their narrow side. Alternatively, a panoramic roof made of glass can also rest on the U-shaped flat profile.

In a further embodiment, an end profile connects the free limbs of the U-shaped profile. In this way, a circumferential roof frame is created for the driver's canopy. This circumferential roof frame is preferably connected to the four pillars, wherein a further circumferential frame profile can also surround the roof frame made of a U-shaped profile and end profile.

In an embodiment, each of the two side walls comprises an intermediate plate which is connected at the end to the A-pillar and B-pillar. The intermediate plate serves as a core for the construction of the side wall which forms a type of sandwich structure with the intermediate plate in the center.

In an embodiment, a terminating upper cover panel is affixed, flush with the A-pillar, to the side of the intermediate plate pointing towards the outer side of the driver's cab. In particular, the upper cover panel terminates flush with one of the A-pillars and its limbs at the corner profile. Alternatively, the upper cover panel can also be configured integrally with one of the limbs of one of the A-pillars. By affixing the intermediate plate to its fastening on the A-pillar on the inner side of the limb of the corner profile, the intermediate plate is set back so that the upper cover panel can terminate flush with the A-pillar. A lower cover panel is additionally affixed to the side of the support plate pointing towards the interior of the driver's cab, forming a joint with respect to the upper cover panel. The particular advantage of an inwardly offset support plate, to which the lower cover panel is fastened, is that the support plate is affixed further in and the lower cover panel thus has a deeper joint, in particular with respect to the upper cover panel.

An A-pillar can be equipped with a boarding plate on one side in the area for boarding the driver's cab as well. The boarding area is, in this case, preferably delimited by one of the A-pillars and by the boarding plate affixed to the other A-pillar on its opposite side. Boarding areas, in which boarding plates are affixed to both sides of the A-pillar, are also essentially possible.

In an embodiment, the pillars are welded to the driver's canopy and to the intermediate plate of the other side walls. As a whole, the driver's cab forms a welded construction, wherein, due to the boarding area, the two A-pillars are not simply directly connected to one another at their ends pointing away from the driver's canopy, but by means of a boarding support.

In an embodiment, the end wall has a holding section for a driving protective screen. The end wall of the driver's cab forms the transition from the drive portion to a load portion of the industrial truck. In particular in the case of reach trucks, but also in the case of other industrial trucks having a lifting mast, a driver's protective screen at least partially covering the area between the driver's cab and load portion is provided, which prevents reaching into or other contact with the lifting mast from the driver's cab.

In order to further improve the driver's view, a viewing aperture can be provided in at least one of the A-pillars. This is preferably provided centrally in the rounded transition area of the A-pillar. If only one A-pillar is configured as a corner profile, this is preferably configured adjacent to a driving position, in particular a driver's seat or a driver's standing platform.

BRIEF DESCRIPTION OF THE DRAWINGS

One preferred exemplary embodiment of the driver's cab according to the invention is presented in greater detail with reference to the following figures, wherein:

FIG. 3 illustrates a perspective view of an embodiment of the driver cab;

DETAILED DESCRIPTION OF THE INVENTION

Figure 1:
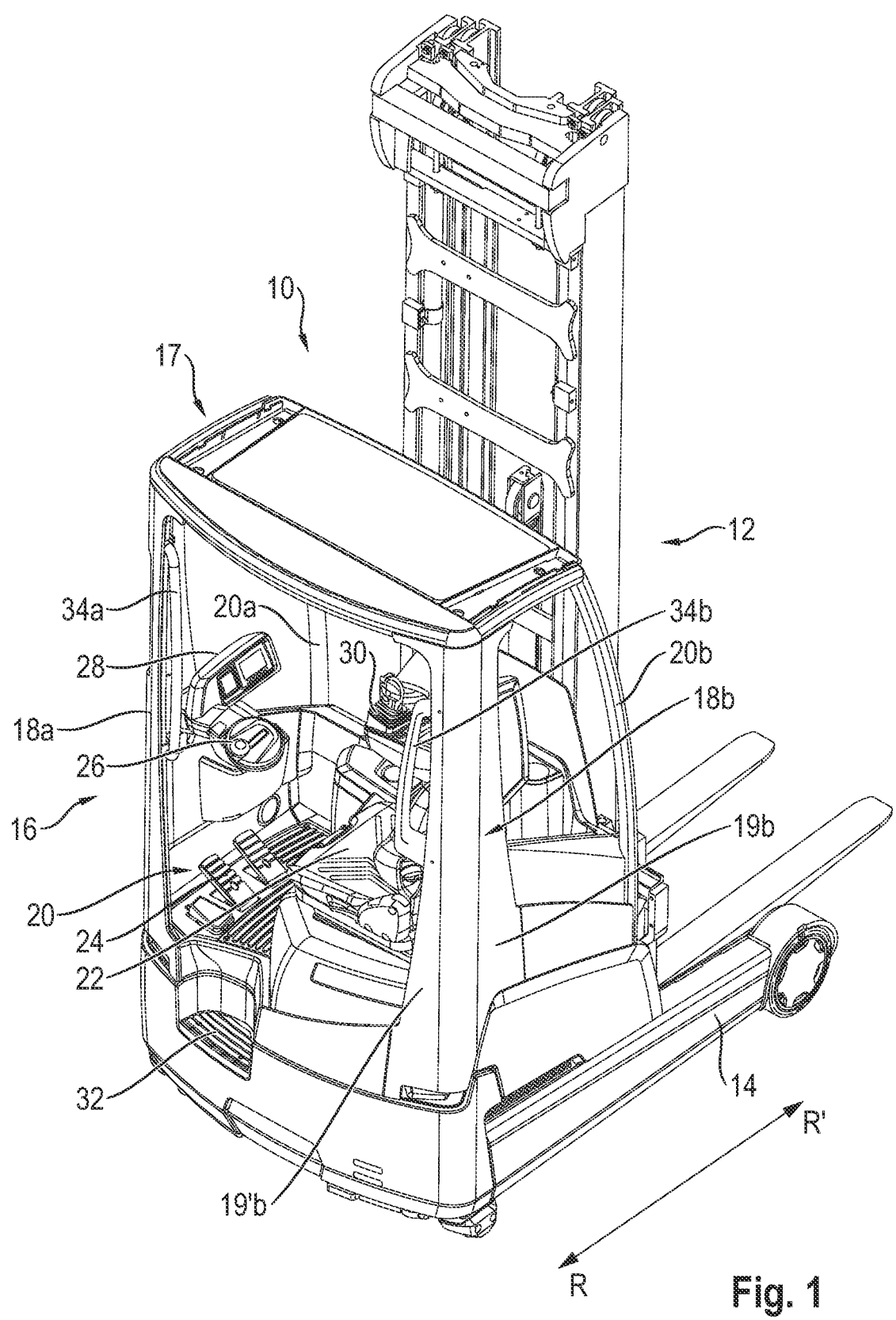
FIG. 1 illustrates a top perspective view of an embodiment of a driver cab.

FIG. 1 shows an industrial truck 10 which is configured as a reach truck. The industrial truck has a thrust mast 12 which can be adjusted along the wheel arms 14.

A driver's cab 16 has a driver's canopy or driver canopy (only shown incompletely in FIG. 1), which is supported by four pillars 18a, 18b, 20a, 20b. Based on the thrust mast 12, the pillars 20a, 20b are designated B-pillars or end wall pillars. The B-pillars 20a, 20b consist of a tubular profile which has a round cross-section. The pillars 18a, 18b delimiting the boarding area 20 are designated below as A-pillars or entry way pillars. The distinction of A-pillars and B-pillars is arbitrarily fixed for the industrial truck 10, without reference to a direction of travel, since the vehicle moves in both directions R and R' during regular operation. The two A-pillars are configured as corner profiles which comprise flat limbs 19b and 19'b. Both limbs 19b and 19'b are located at least at a right angle, preferably at an angle of 100° to 130° to one another. In an embodiment, both A-pillars are configured as corner profiles. If only one corner profile is provided, then the A-pillar close to the driver is preferably configured as a corner profile.

A driving position is provided inside the driver's cab, which has a driver's seat 22 with foot pedals 24, a steering wheel 26 and operating display 28. A hand-held control device 30 is additionally provided on the side pointing towards the thrust mast 12, next to the driver's seat 22. The driving position inside the driver's cab can be entered by means of a step 32, wherein handles 34 affixed laterally to the A-pillars assist the driver.

Figure 2:
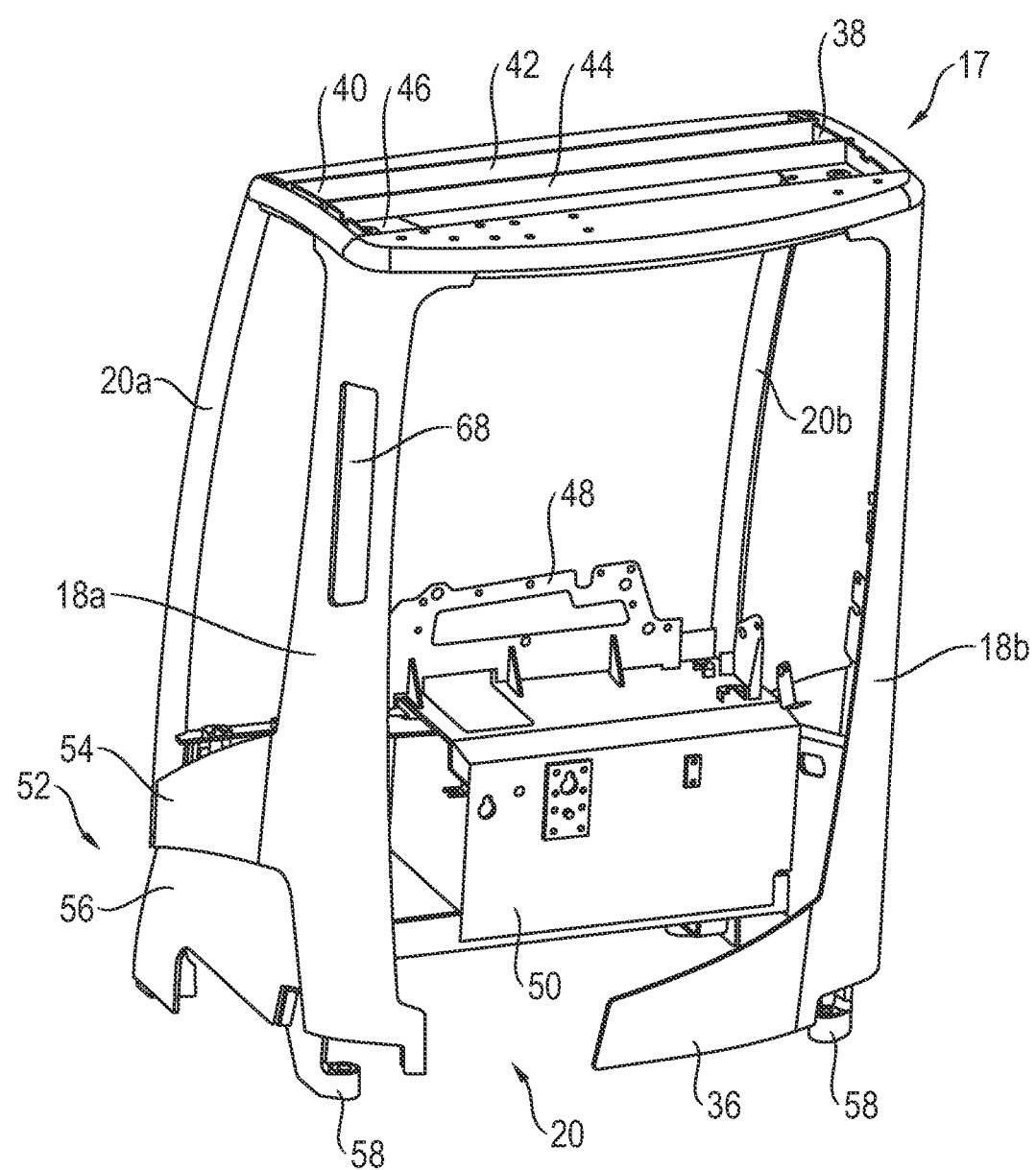
FIG. 2 illustrates a perspective view of an embodiment of the driver cab having a driver canopy, which has not yet been assembled.

FIG. 2 shows the driver's cab, which has not yet been installed in the vehicle, with a view of the boarding area 20 which is delimited by the A-pillars 18a, 18b. The boarding area 20 is laterally delimited by a boarding plate 36. The boarding plate 36 is connected to the A-pillar 18b. In addition, a boarding support (which is not shown in FIG. 2) is provided, with which the A-pillar 18b is connected to the A-pillar 18a or respectively to the boarding plate 36.

In FIG. 2, the more detailed construction of the driver's canopy 17 can be seen. Accordingly, both the holding profiles 38, 40 are arranged upright. Two transverse profiles 42 and 44 span between the holding profiles 38 and 40. The holding profiles 38, 40 are bent up perpendicularly from a U-shaped flat plate or profile 46. The flat plate 46 forms an edge part. The transverse profiles 42, 44 are arranged in the holding profiles 38 and 40 inclined obliquely with respect to the perpendicular.

FIG. 2 additionally shows a holding section 48, to which a protective screen for the driver can be affixed. The component area 50 which is likewise represented serves to demarcate the components required for the operation of the industrial truck with respect to the interior. The component area 50 extends from a back wall of the driver's cab into the cab's interior.

FIG. 2 likewise shows the construction of a side wall 52, which has a cover panel 54 which substantially terminates flush with the A-pillar 18a. A support plate 56, which forms the side wall in the represented embodiment below the cover panel 54, can likewise be represented. A lower cover panel which is fastened to the support plate 56 is not represented in FIG. 2. In this case, the upper cover panel 54 and lower cover panel have a particularly deep joint with respect to one another.

In FIG. 2, fastening means 58, by means of which the driver's cab can be fastened to the vehicle frame, can additionally be seen. The fastening means are configured here in the form of eyelets or rings.

FIG. 3 shows a further view of the driver's cab 16. The U-shaped flat profile 46 with its chamfered holding profiles 38, 40 can be seen for the driver's canopy 17. The free ends of the U-shaped flat profile 46 are connected to one another by means of an end profile 62. In the case of one configuration as a panoramic roof, the U-shaped flat profile is closed towards the strut, in order to create a support for the adhesive and a panoramic screen. With respect to the construction of the side wall, detail A shows the use of an intermediate plate 64 which is extensively welded to the A-pillar 18a. Detail B only shows the intermediate plate 64 in its welded-on position, wherein the intermediate plate 64 is welded onto one limb 66 of the corner profile. The upper cover panel 54 is fastened, preferably welded, to the intermediate plate 64 from outside. It is also possible to configure the upper cover panel 54 integrally with one limb of the adjoining A-pillar. A support plate 56 is welded onto the intermediate plate 64 on the inner side. A particular effect of the support plate 56 which is located further in is that the lower covering part, which is fastened to the support plate 56 and which is located below the upper covering part 54, is fastened, in a further set back manner, and consequently, a particularly deep joint can be formed between the upper covering parts and the lower covering part.

In the case of the driver's cab explained above, a series of effects interact in order to provide a good view for the driver. One aspect is that, due to the bent form of the A-pillars 18a, 18b, combined with the greatest possible stability, only a small angular range of the driver's view is concealed. It is furthermore possible to provide a viewing aperture 68 (FIGS. 2, 4a) without any detrimental effects on the stability. It is also possible to pull down the side walls relatively far in the direction of the vehicle frame, due to the stabilizing effect of the intermediate plate and the additional bracing provided by the support plate, so that this also creates a large field of view.

Figure 4A:
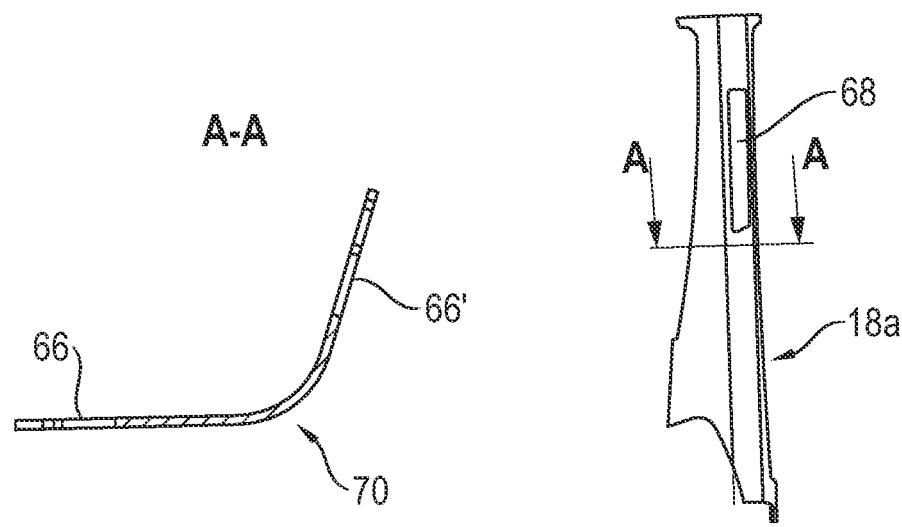
FIG. 4a illustrates an embodiment of an A-pillar.

FIG. 4a shows an A-pillar 18a with its viewing aperture 68. Additionally, a section along line A-A is represented, in which the two limbs 66, 66' of the corner profile can be seen. The limbs substantially extend in a straight manner from a rounded transition area 70.

Figure 4B:
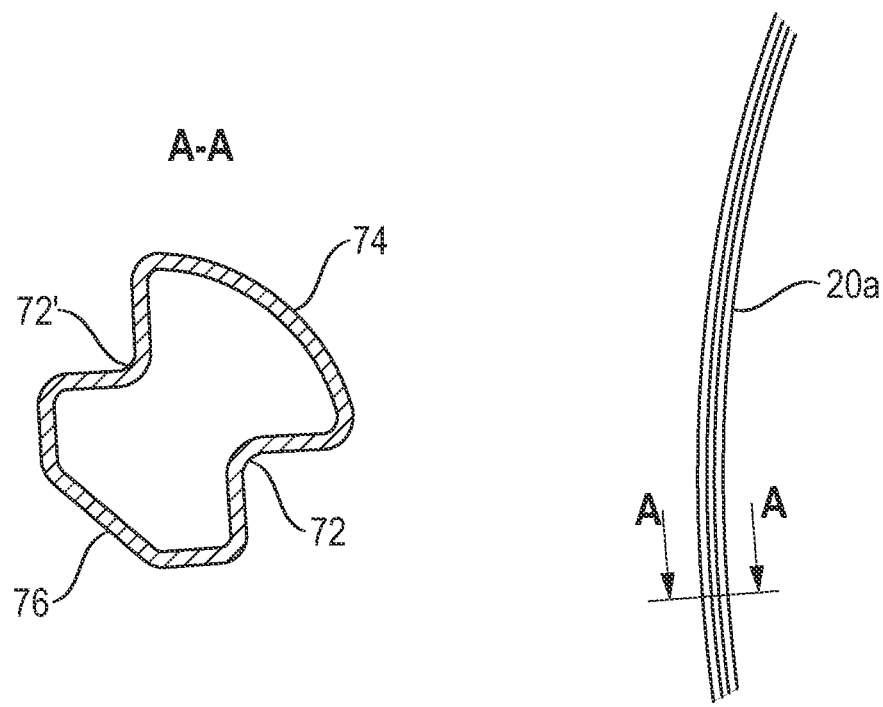
FIG. 4b illustrates an embodiment of a B-pillar.

FIG. 4b shows a B-pillar 20a with its section A-A. The cross-section of the B-pillar 20a is hollow and has a substantially eight-shaped form as a round double profile. The form has two waists 72, 72' opposite one another, which extend in a rounded section 74 and a flattened section 76. The sections 74 and 76 are bulged out with respect to the waist sections 72,72'.

LIST OF REFERENCE NUMERALS

10 Industrial truck
12 Thrust mast
14 Wheel arms
16 Driver's cab
17 Driver's canopy
18a,b A-pillars
19b, 19'b Limbs
20 Boarding area
20a,b B-pillars
22 Driver's seat
24 Foot pedals
26 Steering wheel
28 Operating display
30 Hand-held control device
32 Step
34 Handles
36 Boarding plate
38 Holding profile
40 Holding profile
42 Transverse profile
44 Transverse profile
46 U-shaped flat profile
48 Holding section
50 Boundary area
52 Side wall
54 Upper cover panel
56 Support plate
58 Fastening means
62 End profile
64 Intermediate plate
66, 66' Limbs
68 Viewing aperture
70 Transition area
72, 72' Waist
74 Rounded section
76 Flattened section

The invention claimed is:

1. A driver cab for an industrial truck comprising:
a driver canopy supported by four pillars, wherein two of the four pillars are configured as entry way pillars and two of the four pillars are configured as end wall pillars;
a side wall extending between each of the entry way pillars and the end wall pillars;
an end wall extending between the end wall pillars; and
a boarding area extending between the entry way pillars,
wherein each of the end wall pillars comprises a tubular profile and at least one of the entry way pillars comprises a corner profile which comprises two limbs arranged at an angle with respect to one another, and
wherein at least one of the entry way pillars defines a viewing aperture.

2. The driver cab according to claim 1, wherein both entry way pillars are configured as a corner profile, and wherein each comprises two limbs arranged at an angle with respect to one another.

3. The driver cab according to claim 2, wherein the limbs of the corner profiles are configured as flat limbs which are connected to one another by a rounded transition area which forms an outer edge of the driver cab.

4. The driver cab according to claim 1, further comprising at least one fastening means for fastening the driver cab to a vehicle frame.

5. The driver cab according to claim 1, wherein the driver canopy comprises two holding profiles that are each bent to form a U-shaped flat plate, and wherein one or more transverse profiles extend between the limbs.

6. The driver cab according to claim 5, further comprising an end profile configured to connect free ends of the U-shaped flat plate to one another to form a circumferential roof frame.

7. The driver cab according to claim 6, wherein each side wall comprises an intermediate plate extending between the entry way pillar and end wall pillar, and wherein on a support plate is coupled to the intermediate plate on a side facing an interior of the driver cab.

8. The driver cab according to claim 7, further comprising a terminating upper cover panel fastened to an outward facing surface of the intermediate plate and an adjacent entry way pillar.

9. The driver cab according to claim 8, further comprising a lower cover panel coupled to an outward facing side of the support plate and forming a joint with the upper cover panel.

10. The drive cab according to claim 8, wherein each of the intermediate plates are welded to the entry way pillars, and wherein the end wall pillars are welded to the cover panel and the support plate.

11. The driver cab according to claim 1, wherein the boarding area is delimited on one side by one of the entry way pillars and is delimited on an opposite side by a boarding plate affixed to the other entry way pillar.

12. The driver cab according to claim 1, wherein the four pillars are welded to the driver canopy.

13. The driver cab according to claim 1, wherein the end wall comprises a holding section for a protective screen.

14. The driver cab according to claim 1, wherein the entry way pillar configured as a corner profile is positioned adjacent to a driving position.

15. The driver cab according to claim 1, wherein the two limbs are positioned at an angle of at least 90° with respect to one another.

\* \* \* \* \*